United States Patent [19]

Ogusi et al.

[11] Patent Number: 5,061,559
[45] Date of Patent: Oct. 29, 1991

[54] PRESSURE-SENSITIVE ADHESIVE STRUCTURE

[75] Inventors: Yhoshimi Ogusi, Oomiya; Norio Matsuki, Kamisu, both of Japan

[73] Assignee: Shin-Etsu Chemical Co., Ltd., Tokyo, Japan

[21] Appl. No.: 385,106

[22] Filed: Jul. 26, 1989

[30] Foreign Application Priority Data

Jul. 27, 1988 [JP] Japan .................... 63-187258

[51] Int. Cl.$^5$ .................... B32B 7/12; B32B 27/08
[52] U.S. Cl. .................... 428/343; 427/41; 428/352; 428/421; 428/422; 428/447; 428/913
[58] Field of Search ............ 428/343, 913, 914, 447, 428/352, 195, 421, 422; 427/41, 35

[56] References Cited

U.S. PATENT DOCUMENTS

| | | | |
|---|---|---|---|
| 4,555,427 | 11/1985 | Kawasaki et al. | 428/914 X |
| 4,559,273 | 12/1985 | Kutsukake et al. | 428/914 X |
| 4,626,256 | 12/1986 | Kawasaki et al. | 428/447 X |
| 4,650,494 | 3/1987 | Kutsukake et al. | 428/913 X |
| 4,749,625 | 6/1988 | Obayashi et al. | 428/463 X |
| 4,820,687 | 4/1989 | Kawasaki et al. | 428/913 X |
| 4,847,372 | 8/1989 | Ginkel et al. | 428/352 |
| 4,889,767 | 12/1989 | Yokoyama et al. | 428/336 |
| 4,927,666 | 5/1990 | Kawasaki et al. | 428/195 X |

*Primary Examiner*—Thomas J. Herbert, Jr.
*Attorney, Agent, or Firm*—Oblon, Spivak, McClelland, Maier & Neustadt

[57] ABSTRACT

The pressure-sensitive adhesive structure of this invention comprises a substrate comprising a polyvinylidene fluoride resin, a fluorine-containing silicone release agent layer, and a silicone release agent layer; at least one surface of said polyvinylidene fluoride resin substrate being previously subjected to a low-temperature plasma treatment.

This pressure-sensitive adhesive structure has a remarkably superior weathering resistance, and is useful as outer coverings of vehicles, outer coverings of constructions, mending materials, advertising signboard materials, materials for aircrafts, materials for space industries, and so forth.

5 Claims, 1 Drawing Sheet

PRESSURE-SENSITIVE ADHESIVE STRUCTURE

BACKGROUND OF THE INVENTION

1. Field of the Invention

This invention relates to a pressure-sensitive adhesive structure (or structural body) having a superior weathering resistance.

2. Description of the Prior Art

Pressure-sensitive adhesive structures comprising a polyvinyl chloride film coated with a pressure-sensitive adhesive or comprising a polyethylene film coated with a pressure-sensitive adhesive, have been hitherto used as pressure-sensitive adhesive structures such as pressure-sensitive adhesive films and pressure-sensitive adhesive sheets.

The above conventional pressure-sensitive adhesive structures, however, have a poor weathering resistance, and hence may seriously undergo a lowering of properties, as exemplified by a color change, a decrease in surface gloss, a decrease in bending strength, a lowering of elongation, or a decrease or loss of adhesive force, when they are used outdoors. They also tend to cause peeling, contamination, and so forth. For example, pressure-sensitive adhesives mainly composed of natural rubbers or synthetic rubbers, used in conventional pressure-sensitive adhesive tapes, have a poor weathering resistance and thus may seriously undergo color changes and deterioration of properties.

Even with use of an acrylic pressure-sensitive adhesive, having a relatively high weathering resistance, no sufficient weathering resistance can be still obtained. Moreover, this acrylic pressure-sensitive adhesive has the disadvantages that it can adhere to non-polar surfaces with difficulty and has a small adhesive force at a low temperature.

SUMMARY OF THE INVENTION

The present inventors made various studies, intending to obtain a pressure-sensitive adhesive having a superior weathering resistance. As a result, they found that there may be used i) a substrate comprising polyvinylidene fluoride (hereinafter "PVdF"), having excellent weathering resistance, corrosion resistance, chemical resistance, etc. and also having excellent workability, ii) a pressure-sensitive adhesive comprised of a silicone pressure-sensitive adhesive, having excellent weathering resistance, and iii) a release agent comprised of a fluorine-containing silicone release agent, capable of retaining release properties to this silicone pressure-sensitive adhesive and also good release properties even after storage for a long period of time, and, in addition, the surface of a substrate layer may be subjected to a low-temperature plasma treatment, so that the adhesion between the above release agent and substrate layer can be improved and hence a pressure-sensitive adhesive structure having a superior weathering resistance can be obtained. This invention has been thus accomplished.

Stated summarily, this invention provides a pressure-sensitive adhesive structure, comprising a substrate comprising a polyvinylidene fluoride resin, a fluorine-containing silicone release agent layer, and a silicone release agent layer; at least one surface of said polyvinylidene fluoride resin substrate being previously subjected to a low-temperature plasma treatment.

DETAILED DESCRIPTION OF THE INVENTION

Layer constitution

The pressure-sensitive adhesive structure of this invention usually comprises a substrate and laminated thereon at least one pressure-sensitive adhesive layer and at least one release agent layer.

The pressure-sensitive adhesive structure of this invention may not be limited to have only the above substrate layer, pressure-sensitive adhesive layer and release agent layer. It may optionally have an additional layer, e.g., a laminating substrate between, or on an outermost side of, the above three layers.

This laminating substrate may be appropriately used in an appropriate thickness, depending on the functions required in pressure-sensitive adhesive structures, the uses thereof, etc. The laminating substrate is usually peeled and thrown away when pressure-sensitive adhesives are actually used. Hence, inexpensive materials such as papers are preferred, although there are no particular limitations on the materials for the laminating substrate.

Figure 1:
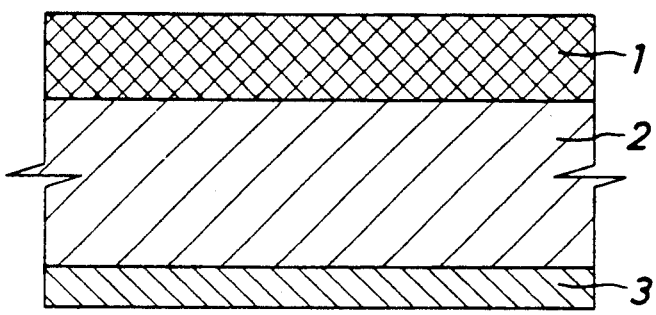
FIGS. 1 to 3 are cross sections to illustrate cross-sectional constitution of the embodiments of the pressure-sensitive adhesive structures according to this invention.
Figure 2:
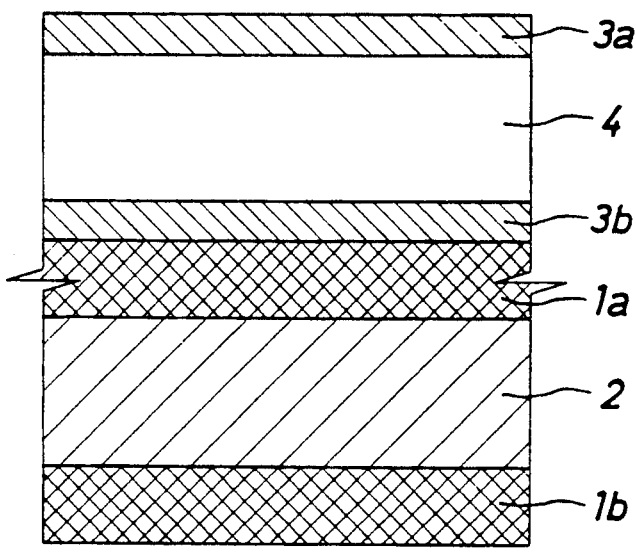
Figure 3:
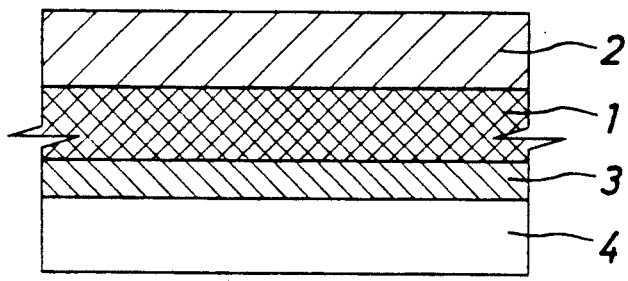

Structural examples of the pressure-sensitive adhesive structure of this invention include those illustrated in FIGS. 1 to 3.

The example illustrated in FIG. 1 is a structure in which a pressure-sensitive adhesive layer 1 is laminated on one side of a substrate layer 2 and a release agent layer 3 is laminated on the other side thereof. When this structure is rolled up on a paper core or the like and formed into a continuous structure, it can be used as a single-sided pressure-sensitive adhesive tape, a single-sided pressure-sensitive adhesive sheet, etc.

Next, the example illustrated in FIG. 2 is a structure in which one release agent layer on a laminating substrate 4 laminated on its both sides with release agent layers 3a and 3b and one pressure-sensitive adhesive layer on a substrate layer 2 laminated on its both sides with pressure-sensitive adhesive layers 1a and 1b are laminated. This structure also can be rolled up on a paper core or the like, and can be used as a double-sided pressure-sensitive adhesive sheet or a double-sided pressure-sensitive adhesive tape.

The example illustrated in FIG. 3 is a structure in which a pressure-sensitive adhesive layer on a substrate layer 2 laminated on its one side with a pressure-sensitive adhesive layer 1 and a release agent layer on a laminating substrate 4 laminated on its one side with a release agent layer 3 are laminated. This structure can be applied as a label or the like.

Substrate layer

The vinylidene fluoride resin that forms the substrate layer of the pressure-sensitive adhesive structure of this invention is obtained by polymerizing vinylidene fluoride alone or a monomer mixture containing vinylidene fluoride. The monomer mixture containing vinylidene fluoride contains vinylidene fluoride and other monomers copolymerizable with vinylidene fluoride. Said other monomers copolymerizable with vinylidene fluoride include, for example, fluorine monomers such as tetrachloroethylene, chlorotrifluoroethylene, vinyl fluoride, and hexafluoropyrene, and acrylate or methacrylate monomers such as alkyl acrylates or alkyl methacrylates. These other monomers may be used alone or in combination of two or more monomers. These other monomers may be contained usually in an amount of 30% by weight in the vinylidene fluoride resin.

In the pressure-sensitive adhesive structure of this invention, at least one surface of the substrate layer is required to have been subjected to a low-temperature plasma treatment. More specifically, the surface of the substrate layer with which the release agent layer and/or pressure-sensitive adhesive layer come(s) into contact is previously subjected to a low-temperature plasma treatment. This low-temperature plasma treatment makes it possible to form on the substrate layer a surface having a high adherence to both the silicone pressure-sensitive adhesive and fluorine-containing silicone release agent. In particular, the substrate layer surface with which the release agent layer comes into contact may preferably be subjected to the low-temperature plasma treatment. This can make sufficiently high the adhesion between the substrate layer and release agent layer, without transfer of the release agent to the pressure-sensitive adhesive layer. Thus, the adhesive force of the pressure-sensitive adhesive layer can be retained in a good state even after storage for a long period of time.

In usual instances, this low-temperature plasma treatment may be carried out by the methods commonly available. For example, it may be carried out in a plasma treatment apparatus under conditions of an argon gas atmosphere, a pressure of 0.6 Torr, a frequency of 110 KHz, a discharge power density of 6 W/cm$^2$, and a discharge-treating total power of 40 W.sec/cm$^2$.

The substrate layer comprising the vinylidene fluoride resin is usually colorless and transparent, but may be optionally colored by adding coloring matters such as pigments.

It is also possible to optionally add in this substrate layer, fillers comprising reinforcing fibers such as carbon fiber, glass cloth, whisker, and aramid fiber; functional admixtures that impart functions such as magnetic properties, light-emitting properties, conductive properties, shrink properties, and water absorption properties; and other additives such as metallic powders, metallic oxides, and metallic hydroxides.

The above substrate layer may have a thickness of, for example, from 10 to 200 micrometers, and particularly from 20 to 100 micrometers, which depends on the purpose for which the pressure-sensitive adhesive structure is used.

Pressure-sensitive adhesive layer

In the pressure-sensitive adhesive structure of this invention, from the viewpoint of a high adhesion to be obtained, preferably used as the silicone pressure-sensitive adhesive that constitutes the pressure-sensitive adhesive layer are, for example, silicone pressure-sensitive adhesives mainly composed of dimethylpolysiloxane. These may be used alone or in combination of two or more kinds.

Commercially available specific products of the above silicone pressure-sensitive adhesives may include KR-130, KR-120, KR-101-10, produced by Shin-Etsu Chemical Co., Ltd.; SH-4280, produced by Toray Silicone Co., Ltd.; YR 3340, produced by Toshiba Silicone Co., Ltd.; and DC 282, produced by Dow-Corning Corp.

This silicone pressure-sensitive adhesive layer can be obtained by applying the silicone pressure-sensitive adhesive on the surface of the substrate layer on which surface the pressure-sensitive adhesive layer is laminated, according to a conventional coating method to have a thickness of usually from about 10 to about 300 micrometers, and preferably from about 20 to about 80 micrometers, followed by heating at 100° to 200° C. An excessively small thickness of the silicone pressure-sensitive adhesive layer may result in an insufficient adhesive force, also tending to cause unevenness in the adhesive force. On the other hand, an excessively large thickness may not only cause an increase in the cost but also sometimes result in a weak adhesive force on the contrary.

Release agent layer

In the pressure-sensitive adhesive structure of this invention, the fluorine-containing silicone release agent that constitutes the release agent layer includes, for example, fluorine-containing silicone release agents mainly composed of a copolymer of fluoroalkyl vinyl monomers with silicone vinyl monomers, as disclosed in Japanese Pre-examination Patent Publication (KOKAI) No. 228078/1986.

In this invention, particularly preferably used are release agents mainly composed of a copolymer obtained from a monomer mixture comprising;

from 50 to 98 parts by weight of a fluoroalkyl vinyl monomer;

from 2 to 50 parts by weight of a silicone vinyl monomer; and optionally not more than 49 parts by weight of a vinyl monomer copolymerizable with a fluoroalkyl vinyl monomer.

These fluorine-containing silicone release agent may be used alone or in combination of two or more kinds.

Commercially available specific products of the above fluorine-containing silicone release agent may include Sin-Etsu Silicone X-70-201, produced by Shin-Etsu Chemical Co., Ltd.

This fluorine-containing silicone release agent layer can be obtained by applying the above fluorine-containing silicone release agent on the surface of the substrate layer or laminating substrate, according to a conventional coating method to have a thickness of usually from about 0.1 to about 5 micrometers, and preferably from about 0.5 to about 1 micrometers, followed by heating at 70° to 150° C. An excessively small thickness of the fluorine-containing silicone release agent layer may result in an insufficient release effect, particularly tending to cause unevenness in the release properties. On the other hand, an excessively large thickness may not only cause an increase in the cost but also sometimes result in impairment of the surface properties and physical properties of films.

Pressure-sensitive adhesive structure

The pressure-sensitive adhesive structure of this invention has a superior weathering resistance, and may not cause any color change or any deterioration of surface gloss even when used outdoors for a long period of time. It also employs the PVdF and fluorine-containing silicone release agent having good anti-staining properties, so that it may be contaminated with difficulty by water, oil, etc. and can keep a beautiful appearance. Moreover, the substrate layer and the pressure-sensitive adhesive layer are flame-retardant, so that the frame retardancy of an article to which this pressure-sensitive adhesive structure has been adhered can also be improved.

The pressure-sensitive adhesive structure of this invention can be utilized for various uses. However, because of the superiority particularly in the weathering resistance, it can be preferably used, for example, as outer coverings of vehicles, outer coverings of constructions, mending materials, advertising signboard materials, materials for aircrafts, and materials for space industries.

EXAMPLES

This invention will be described below in greater detail by giving Examples and Comparative Example.

EXAMPLE 1

Using an extruder, polyvinylidene fluoride (Soref 1010; available from Sorbay Co.) was extruded from a T-die at 250° C. and took on a cooling roll, thus preparing a polyvinylidene fluoride film of 0.050 mm thick and 500 mm wide. The film obtained was transparent and had a surface gloss.

This film was treated with plasma of argon gas by using a continuous low-temperature plasma treatment apparatus (manufactured by Hitachi, Ltd.). The surface of the film having been subjected to the plasma treatment was found to have a contact angle to water, of 50 degrees (the contact angle to water before plasma treatment: 100 degrees or more), having a surface activity made higher.

Next, one side of the plasma-treated film was coated with a fluorine-containing silicone release agent (X-70-201, a product of Shin-Etsu Chemical Co., Ltd.), followed by drying to effect curing. Thereafter, the other side of the film was coated with a silicone pressure-sensitive adhesive (Shin-Etsu Silicone KR-101-10; a product of Shin-Etsu Chemical Co., Ltd.) in a coating weight of 0.5 mg/cm$^2$, followed by drying and winding up, thus obtaining a pressure-sensitive adhesive structure comprising a release agent layer on its one side and a pressure-sensitive adhesive layer on the other side.

The resulting rolled pressure-sensitive adhesive structure was wound off, where the peel force between the release agent layer and pressure-sensitive adhesive layer was found to be 10 g/20 mm (a value in terms of a roll width of 20 mm; the same applies hereinafter). This pressure-sensitive adhesive structure was further left to stand at 30° C. for 30 days. The peel force after that was found to be 15 g/20 mm, showing a very small change with time.

A test piece was also prepared by sticking the pressure-sensitive adhesive layer of the pressure-sensitive adhesive structure to an aluminum sheet. This test piece was used in a weathering resistance test and a thermal resistance test. The weathering resistance test was carried out using a weatherometer, manufactured by Suga Shikenki K. K., to measure the peel force after lapse of 400 hours. The thermal resistance test was carried out by leaving the test piece to stand in an air-circulating oven of 150° C. for 300 hours, and thereafter the peel force of the test piece was measured.

Results obtained were as follows:

| | Peel force* |
| --- | --- |
| Initial stage | 1.5 kg/20 mm |
| After weathering resistance test | 1.3 kg/20 mm |
| After thermal resistance test | 1.4 kg/20 mm |

*A value determined by calculating the width of the pressure-sensitive adhesive structure as 20 mm.

The pressure-sensitive adhesive structure observed after the weathering resistance also showed the same transparency and surface gloss as those before the test, showing no changes at all and no coloring.

COMPARATIVE EXAMPLE 1

Example 1 was repeated but using a vinylidene fluoride film not subjected to the plasma treatment, thus obtaining a pressure-sensitive adhesive structure comprising a release agent layer on its one side and a pressure-sensitive adhesive layer on the other side.

The resulting pressure-sensitive adhesive structure showed so a poor adhesion between the release agent and vinylidene fluoride that the release agent had transferred to the surface of the pressure-sensitive adhesive layer, bringing about a great unevenness in the adhesive force. As to the peel force measured at different points on the film surface, it showed a value scattering over a range of from 0.1 to 1 kg/20 mm. As to the peel measured at different points on the film surface after the pressure-sensitive adhesive structure wound up in a roll was left to stand at 30° C. for 30 days, it showed a value ranging from 0.1 to 0.5 kg/20 mm.

COMPARATIVE EXAMPLE 2

In Example 1, a Teflon sheet with release properties was used in place of the polyvinylidene fluoride resin film on one side of which the cured film comprising the fluorine-containing silicone release agent was formed. A pressure-sensitive adhesive tape using the same pressure-sensitive adhesive as Example 1 was stuck thereon, but the tape was peeled from the Teflon sheet with great difficulty, requiring a peel force of as large as 400 g/20 mm.

COMPARATIVE EXAMPLE 3

Example 1 was repeated but using a natural rubber pressure-sensitive adhesive as the pressure-sensitive adhesive, thus obtaining a film comprising a release agent layer on its one side and a pressure-sensitive adhesive layer on the other side.

This film was subjected to the weathering resistance test. As a result, the pressure-sensitive adhesive turned yellowish brown in 100 hours, and turned blackish brown after 400 hours. The adhesive or peel force between this film and the substrate was found to be 0.1 kg/cm$^2$. The peel force after the thermal resistance test was found to be 0.3 kg/cm$^2$.

We claim:

1. A pressure-sensitive adhesive structure, comprising a substrate comprising a polyvinylidene fluoride resin, a fluorine-containing silicone release agent layer, wherein the silicone release agent is a copolymer formed from fluoroalkyl vinyl monomer and a silicone vinyl monomer in a weight ratio ranging from 50/50 to 98/2, and a pressure-sensitive silicone adhesive layer; at least one surface of said polyvinylidene fluoride resin substrate being previously subjected to a low-temperature plasma treatment.

2. The pressure-sensitive adhesive structure according to claim 1, wherein said substrate layer is held between said release agent layer and pressure-sensitive adhesive layer.

3. The pressure-sensitive adhesive structure according to claim 1, wherein said substrate layer comprises a homopolymer of vinylidene fluoride or a copolymer of vinylidene fluoride with at least one monomer selected from the group consisting of tetrachloroethylene, chlorotrifluoroethylene, vinyl fluoride, hexafluoropyrene, an alkyl acrylate and an alkyl methacrylate.

4. The pressure-sensitive adhesive structure according to claim 1, wherein said pressure-sensitive adhesive layer comprises a silicone pressure-sensitive adhesive mainly composed of dimethylpolysiloxane.

5. The pressure-sensitive adhesive structure according to claim 1, wherein the copolymer of said silicone release agent, in addition, is comprised of not more than 49 parts by weight of a vinyl monomer copolymerizable with said fluoroalkyl vinyl monomer and said silicone vinyl monomer.

* * * * *

UNITED STATES PATENT AND TRADEMARK OFFICE
CERTIFICATE OF CORRECTION

PATENT NO. : 5,061,559
DATED : OCTOBER 29, 1991
INVENTOR(S) : PRESSURE-SENSITIVE ADHESIVE STRUCTURE

It is certified that error appears in the above-identified patent and that said Letters Patent is hereby corrected as shown below:

<u>Col.</u>  <u>Line</u>

3,   3, delete "hexafluoropyrene" and insert
       --hexafluoropropylene--;

Claim 3, line 6, delete "hexafluoropyrene" and insert
       --hexafluoropropylene--.

Signed and Sealed this

Seventh Day of September, 1993

Attest:

BRUCE LEHMAN

Attesting Officer     Commissioner of Patents and Trademarks